3,173,758
PRODUCTION OF SILICON TETRACHLORIDE
Robert N. Secord, Wenham, Mass., assignor to Cabot Corporation, Boston, Mass., a corporation of Delaware
No Drawing. Filed Dec. 15, 1961, Ser. No. 159,778
5 Claims. (Cl. 23—205)

This invention relates to the production of silicon tetrachloride and in particular to an improved process for producing silicon tetrachloride by the reaction of mixtures of silicon carbide, silicon dioxide and carbon with chlorine.

In conventional commercial practice, silicon tetrachloride is usually produced largely from silicon carbide, e.g. from firesand which comprises about 85% SiC by weight, in accordance with a reaction illustrated by the following equation:

(1) $$SiC + 2Cl_2 \rightarrow SiCl_4 + C$$

This process, however, has a number of disadvantages, one of the most troublesome of which resides in the difficulty in producing silicon tetrachloride which is substantially free of lower silicon chlorides. Another is that this process uses an expensive source of silicon, i.e. SiC. Although there have heretofore been attempts to alter the process and thereby improve its economics (see for example U.S. 2,843,458 to R. D. Beattie et al. wherein a mixture of silicon carbide or firesand and other siliceous matter such as silicon dioxide comprise the raw materials of the process), it has not heretofore been generally feasible to chlorinate mixtures of silicon carbide and silicon dioxide in such proportions that the major portion of silicon tetrachloride product could be derived from the more economically attractive reaction illustrated by the following equation:

(2) $$SiO_2 + 2C + 2Cl_2 \rightarrow SiCl_4 + 2CO$$

In accordance with the process of the present invention, however, a mixture of silicon dioxide and silicon carbide is reacted with carbon and chlorine in a fluid bed reactor, the walls of which are substantially protected, to produce silicon tetrachloride which is substantially free of lower silicon chlorides. Moreover, the majority of the silicon tetrachloride product from the process of the present invention is derived from the reaction illustrated by Equation 2 above rather than that of Equation 1.

Thus it is a principal object of the present invention to provide an improved process for the production of silicon tetrachloride.

It is another object of the present invention to provide a process for producing from a mixture of silica and silicon carbide a silicon tetrachloride product which is substantially free of lower silicon chlorides.

It is another object of the present invention to provide a process wherein mixtures of silicon carbide and silicon dioxide are chlorinated under such conditions that most of the silicon tetrachloride product is derived from the silicon dioxide rather than from silicon carbide.

It is another object of the present invention to provide a commercially practicable, fluid bed process for chlorinating silicon containing materials, which process provides for protection of the refractories utilized in lining the fluid bed.

Still another object of this invention is to provide an economically attractive and commercially feasible process for producing silicon tetrachloride simultaneously from both silicon dioxide and silicon carbide.

Other objects will in part be obvious and will in part appear hereinafter.

In accordance with the present invention, it was discovered that under certain conditions, mixtures of silicon dioxide, carbon and silicon carbide can be reacted in a fluid bed with chlorine in such a way that (a) the silicon tetrachloride produced is substantially free of lower silicon chlorides, (b) the refractories utilized in lining the fluid bed are substantially unaffected and (c) the majority of the silicon tetrachloride is derived from silicon dioxide rather than silicon carbide. In particular, it was discovered that these objects are attained when the fluid bed having a fluid bed depth of at least 2 ft. is maintained at a composition by weight of between about 50 and about 98% free carbon, between about 1% and about 49% silicon dioxide and between about 0.5% and about 10% silicon carbide, the exact proportions being such that the silicon carbide content of the bed does not exceed on a molar basis the silica content of the bed, and continuously reacted at a temperature above about 2650° F. and preferably above about 2750° F. with chlorine fed at a rate of between about 35 and 140 lbs./hr. per square foot of cross-sectional bed area. Although it is possible to operate our process at temperatures as high as about 3200° F. or higher, it is usually less advantageous to do so since the problems of reactor maintenance at such temperatures are most severe.

While, as will be immediately obvious to one skilled in the art, the variables set forth above are many and closely interrelated, and accordingly a number of different conditions may produce the desired results, certain guiding principles should be borne in mind in practicing the present invention.

The large excess of free carbon used in the process of the present invention over that stoichiometrically required for the reaction:

$$SiO_2 + 2C + 2Cl_2 \rightarrow SiCl_4 + 2CO$$

has a desirable diluting effect on the bed, protects the reactor walls, and additionally serves as a good heat transfer medium. Of paramount importance, however, is the fact that the large excess of free carbon discourages the net reaction:

(3) $$SiO_2 + C + 2Cl_2 \rightarrow SiCl_4 + CO_2$$

and encourages the net reaction:

$$SiO_2 + 2C + 2Cl_2 \rightarrow SiCl_4 + CO$$

The reaction represented by Equation 3, is most undesirable in that it produces carbon dioxide which, at the temperatures prevalent in the present process, attacks the preferred refractory for lining the walls of the bed, namely graphite. Zirconia and silica refractories could be utilized but these materials would be subject to direct attack by chlorine and, therefore, even greater maintenance would then be required.

It should be mentioned that it was additionally discovered that surprisingly the free carbon product from the reaction:

$$SiC + 2Cl_2 \rightarrow SiCl_4 + C$$

is so finely divided that normally most of it is blown out of the fluid bed and therefore does not substantially contribute to the reservoir of free carbon present in the bed.

Thus, the composition of the bed should comprise between about 50% (and preferably between about 65%) and about 98% free carbon by weight. Under optimum conditions, carbon must comprise between about 75 and about 98% by weight of the bed. The exact type and particle size of the carbon utilized is generally not critical. Particle sizes between about −10 mesh and about +150 mesh have been found to be suitable for the purposes of the present invention. The carbon, of course, is preferably low in ash such as iron compounds, and particularly, is preferably free of hydrogen, since the presence of hydrogen might lead to the production of hydrogen chloride.

Calcined petroleum coke is therefore generally preferred as it is substantially free of hydrogen and low in ash.

The quantity of silicon carbide present in the bed should be maintained as low as possible (a) because the reaction:

$$SiC + 2Cl_2 \rightarrow SiCl_4 + C$$

represents the more expensive route to the production of silicon tetrachloride and thus is preferably minimized as much as possible, and (b) in order to discourage the reaction:

(4) $$SiC + SiCl_4 \rightarrow 2SiCl_2 + C$$

since silicon dichloride is undesirable in itself, because it disproportionates to produce finely divided, amorphous, pyrophoric silicon metal. This latter material reacts with liquid silicon tetrachloride to produce a host of undesirable, homologous, higher boiling, silicon chlorides.

On the other hand, sufficient silicon carbide is preferably provided to supply the heat necessary to maintain the bed at the proper temperature.

The reaction:

$$SiC + 2Cl_2 \rightarrow SiCl_4 + C$$

is substantially exothermic whereas the reaction:

$$SiO_2 + 2C + 2Cl_2 \rightarrow SiCl_4 + 2CO$$

is not normally exothermic to the extent of being self-sustaining at the desired reaction temperatures. Thus the silicon carbide reaction should normally produce sufficient heat to maintain the bed at temperatures at least above about 2650° F. and preferably above about 2750° F. in order to insure that the reaction:

$$SiO_2 + 2C + 2Cl_2 \rightarrow SiCl_4 + 2CO$$

will proceed at a satisfactory rate and become the main reaction. It has been found that a silicon carbide content of between about 0.5% and about 5% and most preferably between about 1% and 3% by weight of the bed is generally optimum.

The quantity of silicon carbide in the bed can, of course, be reduced while maintaining a given temperature level, if auxiliary heat is supplied to the bed, for example by preheating the reactants and/or the contents of the bed by electrical or other means or by flowing extra hot inert gases through the bed. It is intended, therefore, that the supplying of auxiliary heat to the bed be within the scope of the present invention.

The particle size of the silicon carbide utilized is not usually a critical factor, mesh sizes between about −10 and about +150 mesh being completely satisfactory. In practice, firesand and residues from electric furnaces and the like, are completely satisfactory. Needless to say, if a firesand is utilized, which contains, for example, about 80% silicon carbide and 15% silicon dioxide, the silicon dioxide provided in this manner should be taken into account in arriving at the total silicon dioxide content of the bed.

As a general consideration, the silicon dioxide content of the bed should be maintained as high as practicable since the reaction:

$$SiO_2 + 2C + 2Cl_2 \rightarrow SiCl_4 + 2CO$$

is from the point of view of economics, the more desirable route to the production of silicon tetrachloride. However, since said reaction is not self-sustaining, the maximum quantity of silicon dioxide that may be present in the bed is closely associated with the desired operating temperature which will be discussed in more detail hereinafter. In general, it has been found that between about 1% and about 49%, and particularly between about 1% and 30%, by weight of the bed of silicon dioxide is satisfactory for the purposes of the present process. For optimum operation, the silicon dioxide content of the bed should be maintained at between about 1% and about 24% by weight. The particle size of the silicon dioxide likewise is however, not critical, particle sizes on the order of about −10 to about +150 mesh having proven completely satisfactory.

The commercial feasibility of the present process is predicated upon the fluidization of a bed having a fluid bed depth of at least about 2 ft. While beds having a fluid depth of less than about 2 ft. can in some circumstances be utilized, their production rate is apt to be so low as to be uneconomic. On the other hand, although there is no absolute maximum bed height, fluid bed depths above about 8 ft. will not normally be utilized commercially as they offer little if any advantage.

In addition to maintaining a bed of the proper composition in accordance with the guiding principles set forth above, it is also necessary in the practice of the present invention to control the rate of flow of chlorine through the bed. Chlorine fed continuously through the bed at a rate of between about 35 and about 140 lbs./hr./ft.$^2$, and preferably between about 35 and about 110 lbs./hr./ft.$^2$, of bed area usually provides proper fluidization without excessive blowover from the bed, depending, of course, upon bed depth, and the particular particle size, density and other physical characteristics of the silicon carbide, silicon dioxide and carbon utilized. Thus, as will immediately be apparent, the lower the bed depth, and the smaller the particle size and the lower the density of the particular silicon carbide, silicon dioxide and/or carbon utilized, the lower the flow of chlorine that will be required for fluidization and the more readily blowover from the bed will ocur at increased rates of chlorine flow.

Additionally, however, it has been discovered that if the formation of undesirable lower silicon chlorides is to be prevented, the chlorine feed must be further selected and controlled within the above limits to maintain a substantially continuous free chlorine content in the product stream. This unused chlorine should amount to at least about 0.1% by weight of the total chlorine fed to the bed but should be controlled as carefully as possible to avoid undue wastage since it cannot normally be profitably recovered and must be disposed of. Therefore, the amount of free (unused) chlorine in the product stream should be controlled at between about 0.1 and 1% by weight of the total chlorine fed to the bed in order to achieve optimum results. Moreover, we have discovered that the rate of flow of chlorine to the bed can be controlled so as to satisfy this requirement without undue difficulty, using control systems commercially available. However, for maximum flexibility in regulating the chlorine feed, it may be desirable to feed a small amount of an auxiliary fluidizing gas, which should be relatively inert such as nitrogen, carbon monoxide or recycled silicon tetrachloride vapors.

Once the reaction between the silicon values of the bed and chlorine has been initiated, for example by preheating the bed and/or any of the reactants, the reaction will continue so long as reactants continue to be fed to the bed so as to maintain the composition thereof as set forth heretofore. The temperature of the fluid bed is then maintained above about 2650° F. and, preferably above about 2750° F. and preferably not over about 3200° F. It was discovered, moreover, that in conducting a self-sustaining reaction between chlorine and a mixture of silicon carbide, silicon dioxide and carbon, the percentage of the total silicon tetrachloride product derivable from the reaction:

$$SiO_2 + 2C + 2Cl_2 \rightarrow SiCl_4 + 2CO$$

decreases as the higher temperatures within the above range are achieved. Therefore, the temperature in the bed is ideally maintained between about 2750° F. and 3000° F.

The temperature of the bed is, of course, controlled most conveniently by varying the silicon carbide content of the bed relative to the silicon dioxide content. However, further control of the temperature is possible by regulation of the chlorine flow and/or the flow of auxiliary inert gases, such as nitrogen, carbon monoxide or silicon tetrachloride vapors, and the temperatures at which such gases are introduced. Furthermore, provision can also be made to supply supplemental heat electrically in order to permit maximum flexibility in the choice of feed rates.

As will be readily understood by one skilled in the art, since all the factors outlined and discussed above are interrelated, the varying of any one factor under any particular set of operating conditions may engender or require a change in one or more of the others. Nevertheless, the present process constitutes a straightforward, readily achievable and commercially practicable process for the production of silicon tetrachloride which under optimum conditions is chiefly the product of the reaction:

$$SiO_2 + 2C + 2Cl_2 \rightarrow SiCl_4 + 2CO$$

There follow a number of illustrative non-limiting examples:

Example 1

In producing silicon tetrachloride continuously at a temperature of about 3200° F. in a bed having a diameter of 5 feet and a depth when fluidized of about 4 feet, silicon dioxide having an average particle diameter of about 187 microns, firesand comprising 85% by weight silicon carbide and having an average particle diameter of about 300 microns and carbon having an average particle diameter of about 280 microns are introduced into the bed at a rate such as to maintain therein an inventory of about 0.6 lb./ft.$^3$ silicon dioxide, about 0.4 lb./ft.$^3$ silicon carbide and about 28 lbs./ft.$^3$ carbon. Gaseous free chlorine (S.T.P.) is introduced to the bottom of the bed at the rate of about 70 lbs./hr./ft.$^2$ and serves to maintain the bed in a fluidized state. Operating in this manner, it is found that the quantity of silicon carbide and silicon dioxide consumed is about 11.5 lbs./hr./ft.$^2$ and about 15 lbs./hr./ft.$^2$ of bed respectively. Thus, silicon tetrachloride produced in accordance with the reaction:

(2)  $SiO_2 + 2C + 2Cl_2 \rightarrow SiCl_4 + 2CO$ constitutes about 50% by weight of the product. The product stream is found to contain in addition to silicon tetrachloride, carbon monoxide and carbon, about 0.5% by volume free chlorine. The yield of silicon tetrachloride from this run is found to be about 98% of theoretical based on the quantity of chlorine fed to the bed.

Example 2

This example is a duplicate of Example 1 except that only about 65 lbs./hr./ft.$^2$ of chlorine is introduced to the bed rather than about 70 lbs./hr./ft.$^2$ as in Example 1. It is found that substantially no free chlorine is present in the product stream. The percentage of the silicon tetrachloride product produced in accordance with the reaction represented by Equation 2 constitutes about 50% by weight of the total. However, the yield of silicon tetrachloride from this run is found to be about 91% of theoretical based on the quantity of chlorine fed to the bed and it is assumed that the remainder of the chlorine has been utilized in the production of silicon dichloride and other undesirable homologous higher boiling chlorides. Not only does this represent a reduction in production rate but also an absolute economic loss because such undesirable chlorides are difficult to remove, and, even when removed are not readily marketable.

Example 3

In producing silicon tetrachloride continuously at a temperature of about 2800° F. in the apparatus described in Example 1, silicon dioxide having an average particle diameter of about 250 microns, silicon carbide having an average particle diameter of about 221 microns and carbon having an average particle diameter of about 280 microns are introduced into the bed at a rate such as to maintain therein an inventory of about 0.7 lb./ft.$^3$ silicon carbide, about 7 lb./ft.$^3$ silicon dioxide and about 24.5 lbs./ft.$^3$ carbon. Gaseous free chlorine is introduced to the bottom of the bed at the rate of about 70 lbs./hr./ft.$^2$. It is found that silicon carbide is consumed at the rate of about 9.8 lbs./hr./ft.$^2$, of bed and silicon dioxide at the rate of about 17.5 lbs./hr./ft.$^2$ of bed. Thus, the percentage of the silicon tetrachloride produced in accordance with the reaction represented by Equation 2 constitutes about 58% by weight of the total. Moreover, the product stream is found to contain about 0.5% by volume free chlorine. The yield of silicon tetrachloride from this run is found to be about 99% of theoretical based on the quantity of chlorine fed to the bed.

Example 4

In producing silicon tetrachloride continuously at a temperature of about 2800° F., there is supplied to a bed having a diameter of 5 feet and a fluid bed depth of about 6 feet, by means of direct resistance heating about 70,000 B.t.u./ft.$^2$/hr. Firesand comprising 85% by weight silicon carbide and having an average particle diameter of about 221 microns, silicon dioxide having an average particle diameter of about 187 microns and carbon having an average particle diameter of about 280 microns are fed to the bed at a rate such as to maintain in the bed an inventory of about 0.1 lb./ft.$^3$ silicon carbide, about 12 lbs./ft.$^3$ silicon dioxide and about 22 lbs./ft.$^3$ carbon. Gaseous free chlorine (S.T.P.) is introduced to the bottom of the bed at the rate of about 100 lbs./hr./ft.$^2$. It is found that about 1.4 lbs./hr./ft.$^2$ of bed of silicon carbide and about 40 lbs./hr./ft.$^2$ of bed of silicon dioxide is consumed. Thus, the percentage of the silicon tetrachloride product produced in accordance with the reaction represented by Equation 2 constitutes about 95% by weight of the total. Moreover, it is found that the product stream comprises about 0.5% by volume free chlorine. The yield of silicon tetrachloride from this run is found to be about 97.5% of theoretical based on the quantity of chlorine fed to the bed.

Obviously many changes can be made in the above-described process, apparati and examples without departing from the scope of the present invention. For example, although only direct resistance heating was specifically mentioned above as a suitable electrical means for supplying auxiliary heat to the bed, other electrical means such as direct electrical arc methods and dielectric and/or inductive methods can be utilized. Accordingly, it is intended that the above disclosure be regarded as illustrative and as in no way limiting the scope of the invention.

What I claim is:

1. In the process of producing, in a fluid bed reactor having a fluid bed depth of at least about 2 feet, silicon tetrachloride by reacting at temperatures above about 2650° F., silicon dioxide and silicon carbide with carbon and chlorine, said chlorine being continuously fed at a rate of between about 35 and 140 lbs./hr./ft.$^2$ of bed, the improvement which comprises (1) maintaining the composition of said bed by weight at between about 50 and about 98% free carbon, between about 1 and about 49% silicon dioxide and between about 0.5 and about 10% silicon carbide, and further controlling said chlorine feed rate so as to maintain at least about 0.1% by weight of the total chlorine fed to said reactor as free unreacted chlorine in the product stream emerging from said reactor.

2. In the process of producing, in a fluid bed reactor having a fluid bed depth of at least about 2 feet, silicon tetrachloride by reacting at temperatures between about 2750° F. and 3200° F., silicon dioxide and silicon carbide with carbon and chlorine, said chlorine being continuously fed at a rate of between about 35 and 110 lbs./hr./ft.$^2$ of bed, the improvement which comprises maintaining the composition by weight of said bed at between about 65 and about 98% free carbon, between about 1 and about 30% silicon dioxide, and between about 0.5 and about 5% silicon carbide, and further controlling said chlorine feed rate so as to maintain between about 0.1 and about 10% by weight of the total chlorine fed to said reactor as free unreacted chlorine in the product stream emerging from said reactor.

3. The process of claim 2 wherein the temperature is maintained below about 3000° F.

4. In the process of producing, in a fluid bed reactor having a fluid bed depth of at least about 2 feet, silicon tetrachloride by reacting at temperatures between about 2750° F. and 3000° F., silicon dioxide and silicon carbide with carbon and chlorine, said chlorine being continuously fed at a rate of between about 35 and 110 lbs./hr./ft.$^2$ of bed, the improvement which comprises maintaining the composition by weight of said bed at between about 75 and about 98% free carbon, between about 1 and about 24% silicon dioxide, and between about 1 and about 3% silicon carbide, and controlling said chlorine feed rate so that between about 0.1 and about 1% by weight of the chlorine fed to said reactor emerges therefrom as free unreacted chlorine in the product stream.

5. The process of claim 4 wherein the lining of the fluid bed reactor comprises graphite.

References Cited by the Examiner

UNITED STATES PATENTS

| 2,843,458 | 7/58 | Beattie et al. | 23—205 |
| 2,982,620 | 5/61 | Beattie et al. | 23—205 |

FOREIGN PATENTS 1,189,019  9/59  France.

MAURICE A. BRINDISI, *Primary Examiner.*